United States Patent
Hokodate et al.

[11] Patent Number: 6,150,826
[45] Date of Patent: Nov. 21, 2000

[54] DISTANCE DETECTOR FOR FOCUS CONTROL IN LASER BEAM MACHINE

[75] Inventors: Toshiyuki Hokodate; Kentaro Tanaka, both of Tokyo, Japan

[73] Assignee: Mitsubishi Denki Kabushiki Kaisha, Tokyo, Japan

[21] Appl. No.: 09/219,776

[22] Filed: Dec. 23, 1998

[30] Foreign Application Priority Data

Dec. 26, 1997 [JP] Japan ................................. 9-358733

[51] Int. Cl.⁷ .................................................. G01R 27/26
[52] U.S. Cl. ............................................................ 324/662
[58] Field of Search ................................. 324/658, 662, 324/683, 686; 702/66, 70, 71, 74, 75

[56] References Cited

U.S. PATENT DOCUMENTS

| | | | |
|---|---|---|---|
| 4,772,844 | 9/1988 | Andeen et al. | 324/651 |
| 5,070,302 | 12/1991 | Marcus et al. | 324/662 |
| 5,101,165 | 3/1992 | Rickards | 324/662 |
| 5,340,962 | 8/1994 | Schmidt et al. | 219/121.78 |
| 5,428,280 | 6/1995 | Schmidt et al. | 318/568.11 |
| 6,031,380 | 2/2000 | Gleixner et al. | 324/683 |

FOREIGN PATENT DOCUMENTS

| | | |
|---|---|---|
| 3-24300 | 5/1991 | Japan . |
| 7-195188 | 8/1995 | Japan . |

*Primary Examiner*—Safet Metjahic
*Assistant Examiner*—Anjan K Deb
*Attorney, Agent, or Firm*—Sughrue, Mion, Zinn, Macpeak & Seas, PLLC

[57] ABSTRACT

A distance detector detects a distance between a focal position and a workpiece by use of a capacitance. A sensing electrode forms the capacitance relative to said workpiece. An input signal generator generates an alternating signal or an input signal that is input into the sensing electrode. A signal detector detects an alternating signal or a detection signal that is generated at the sensing electrode and that has a value varied in accordance with the capacitance. A computing unit receives the input signal from the input signal generator and the detection signal from the signal detector. The computing unit extracts a component having the same frequency as a frequency of the input signal from the detection signal. Thus, it computes the extracted component to generate a distance information output representing the distance between the focal position and the workpiece.

16 Claims, 11 Drawing Sheets

Output V15 of
A.C. Voltage Source

Output V8 of
Voltage Detecting
Circuit

Output V17 of
Phase-Shifting
Circuit

Output V18 of
Synchronous
Rectifying Circuit

Output V10 of
Low-Pass Filter

Output V8 of Voltage Detecting Circuit

Output V17 of Phase-Shifting Circuit

Output V19 of Multiplying Circuit

Output V10 of Low-Pass Filter

Output V8 of Voltage Detecting Circuit

Output V17 of Phase-Shifting Circuit (Sampling Pulse)

Output V20 of Sampling Circuit

Output V10 of Low-Pass Filter

DISTANCE DETECTOR FOR FOCUS CONTROL IN LASER BEAM MACHINE

BACKGROUND OF THE INVENTION

1. Field of the Invention

This invention relates to a distance detector used in a laser beam machine to detect a focal position of a laser beam or a height of a nozzle.

2. Description of Related Art

In a laser beam machining, several machining conditions are properly set in general, depending on a material or a plate thickness of a workpiece in general. For example, laser output, pulse frequency, assist gas pressure, focal position, or nozzle height should be set and kept appropriately in the machining. Particularly, the focal position and nozzle height are delicate conditions in the machining, and they should be controlled precisely.

Moreover, the laser beam machining is a stroke or linear machining. When the machining is carried out while the laser beam relatively scanning the workpiece, it is necessary to sense a workpiece position and adjust the focal position and nozzle height.

In order to detect the focal position and nozzle height, a distance detector is fitted on a leading end of the nozzle. However, the focus lens and the nozzle are usually mounted on the same frame of the laser beam machine. Therefore, the detector does not individually sense the focal position and nozzle height relative to the workpiece. In general, the distance detector measures the distance between the nozzle end and the workpiece to determine the nozzle height, thereby detecting the position of the focusing lens and a relative position of the nozzle end.

The laser beam machining has increased uses in recent years. Accordingly, there are increased needs for machining metal plate workpieces such as aluminum or stainless steel for decorative use. Therefore, a non-contact type detector is preferably used as the distance detector for preventing scratch by contact. Particularly, a distance detector utilizing a capacity is used in many cases. In addition, there is a request for a distance detector having high responsibility so that the laser beam machining is performed at high speed. In the present situation, the capacitance type distance detector is preferred to a mechanical type.

It is common that such capacitance type distance detector has a sensing electrode disposed at the nozzle end and electrically applies an alternating signal (voltage or current) to the sensing electrode. Then, the alternating signal changes according to capacitance between the sensing electrode and the workpiece. Such changing alternating signal is sensed to determine the capacitance between the electrode and workpiece, so that the alternating signal is transformed into a dc signal that corresponds to the distance between the electrode and workpiece. The dc signal is supplied to a control device thereafter. The control device controls the nozzle height or the distance between the electrode and workpiece in accordance with the dc signal so that it is kept at a desired value.

Specifically, the laser beam machine concentrates the laser beam into a beam spot thereby to radiate it on the workpiece. Then, the material is melted and sublimated to be scattered instantaneously. Thus, a removing machining or mainly cutting is conducted. Therefore, a condenser lens or condenser mirror is provided to condense the laser beam, and in general, a machining nozzle is furnished to jet an assist gas to blow away the melted or sublimated material.

Moreover, it is common to use a sinusoidal signal as the alternating signal for determining the capacitance between the sensing electrode and workpiece. In this case, a voltage of the sensing electrode is detected as a signal corresponding to the capacitance. An amplitude V of the voltage of the sensing electrode is give by the following expression, where a sine wave alternating current of frequency f and amplitude i is applied to the sensing electrode.

$V = 2\pi fCi$

The detected voltage of the sensing electrode becomes a sinusoidal wave of the amplitude V and frequency f. Therefore, such sinusoidal wave is usually rectified and transformed into a dc signal proportional to the amplitude V.

In general, the nozzle end of the laser beam machine should be small in view of operationability. Then, the sensing electrode attached thereto should be small-sized, accordingly. Therefore, the capacitance between the electrode and workpiece is very small, normally 1 pF or less. Moreover, the frequency of the alternating signal is determined by a response frequency regulated by a performance of the laser beam machine. Normally, a frequency of 10 kHz or more is used.

Since the sensed voltage is transformed by the weak capacitance C, it is very easily affected by a disturbance. Accordingly, the dc signal after rectification is further passed through a low pass filter so that a high frequency component of the disturbance is cut off.

A specific circuit of the conventional distance detector described above is exemplified hereunder.

FIG. 14 shows an overall structure of a first conventional distance detector for laser beam machine. FIG. 15 schematically shows such distance detector.

Referring to FIG. 14, a constant alternating current source 7 generates an output of $i = I \sin 2\pi ft$ wherein I is an amplitude of a current, t is a time and f is a frequency. An annular sensing electrode 1 is arranged at a leading end of a nozzle 3 and placed around an area where a laser beam 4 passes through. The current source 7 supplies a constant current i to the sensing electrode 1. The constant current i is transformed by the capacitance C into a voltage as an alternating signal. Such voltage is detected by a voltage detecting circuit 8. Then, the Alternating current is transformed into a dc signal in a rectifying circuit 9. The dc signal contains a high frequency component. Therefore, such unnecessary high frequency component is cut off at a low pass filter 10. Thus, a distance detecting output Vo is obtained.

As mentioned above, the sensed voltage of the sensing electrode 1 serves for measuring a focal position 6 and a nozzle height in relation to a workpiece 2. Namely, the distance detector measures the distance from the end of the nozzle 3 to the workpiece 2, thereby detecting the nozzle height. Then, the detector determines a position of a not-shown condenser lens and a relative position of the nozzle end.

The alternating signal source applied to the sensing electrode 1 may be not only the constant sine-current source, but also a constant sine voltage source. FIG. 16 shows such example or an overall structure of a second conventional distance detector of a laser beam machine. In FIG. 16, the same characters and numerals as those of the first conventional art indicate the same or corresponding elements as those of the first conventional art.

Referring to FIG. 16, the constant alternating voltage source 7A generates an output of $v = V \sin 2\pi ft$. As in the first conventional art, the sensing electrode 1 is disposed at the end of the nozzle 3. A current io is supplied to from the voltage source 7A to the sensing electrode 1. Then, the current io is fed to the capacitance C between the electrode 1 and workpiece 2. A current transformer 13 detects such current io. A current detecting circuit 14 transforms the current io from the transformer 13 into a voltage proportional to the current value. The rectifying circuit 9 transforms an output as an alternating signal from the detecting circuit 14 into a dc signal. Such dc signal contains a high frequency component. Therefore, the low pass filter 10 cuts off the unnecessary high frequency component, thereby providing the distance detecting output Vo.

As mentioned above, the sensed voltage of the sensing electrode 1 serves for measuring the focal position 6 and the nozzle height in relation to the workpiece 2, as in the first conventional art. Then, the nozzle height is detected, so that the position of the condenser lens and the relative position of the nozzle end are determined.

In this conventional art, the sensed current io flowing into the electrode 1 is:

$$io = V/2\pi fC$$

where an amplitude of applied voltage is V, frequency is f and unknown capacitance is C.

In these conventional distance detectors, the low pass filter 10 gets rid of only a part of frequency components included in the disturbance, which is caused by spatter and plasma generated during machining. Consequently, error factor in the distance detector cannot be completely removed.

Particularly, the needs for machining the aluminum, stainless steel or the like increase, as mentioned above. These materials tend to generate plasma or spatter at a laser beam irradiated portion in the laser machining. The capacitance type distance detector constructed as above is subject to the influence of the plasma or spatter, which are the factors in malfunction of the detector.

Such malfunction of the detector causes not only defective laser machining but also collision of the workpiece 2 and he nozzle 3 at worst, thereby damaging the workpiece 2 or laser beam machine itself.

On the other hand, an automatic laser beam machining is introduced due to a demand for saving labor in recent years. Accordingly, reliability in the machining has become more important.

BRIEF SUMMARY OF THE INVENTION

An object of the present invention is to provide a distance detector for laser beam machine that can measure a laser focal position or nozzle height without any influence due to plasma or spatter generated during laser machining, thereby assuring high reliability.

According to a first aspect of the invention, a distance detector is used in a laser beam machine. The laser beam machine detects a distance between a focal position of a laser beam and a workpiece by use of a capacitance. Then, the laser beam machine irradiates a condensed laser beam on the workpiece for laser beam machining, while controlling the distance between the focal position and the workpiece. In the distance detector, a sensing electrode is provided to form a capacitance relative to the workpiece. An input signal generator generates a first alternating signal defining a detection signal. The input signal is input into the sensing electrode. A signal detector detects a second alternating signal defining a detection signal. The detection signal is generated at the sensing electrode and has a value varied in accordance with the capacitance between the sensing electrode and the workpiece. A computing unit is provided. The computing unit receives the input signal from the input signal generator and the detection signal from the signal detector. The computing unit extracts a component having a same frequency as a frequency of the input signal from the detection signal, thereby computing the extracted component to generate a distance information output representing the distance between the focal position and the workpiece.

In this case, the computing unit can extract only a component, which has correlation with the input signal, from the detection signal, by use of information of the input signal applied to the sensing electrode. Therefore, it is possible to remove disturbance induced to the detection signal by unnecessary plasma or spatter in laser beam machining. Consequently, if the plasma or spatter occurs in laser beam machining, a distance measurement is not affected thereby, so that a distance measurement result has high reliability.

The input signal generator preferably has a constant alternating current source. In this case, a detected alternating voltage has amplitude proportional to the capacitance between the sensing electrode and the workpiece. Therefore, it is possible to easily obtain a voltage drop of the sensing electrode generated by the capacitance.

The input signal generator preferably has a constant alternating voltage source. In this case, a supplied alternating current has amplitude proportional to the capacitance between the sensing electrode and the workpiece. Therefore, it is possible to easily obtain a change of the capacitance or the distance between the sensing electrode and the workpiece by the current supplied to the capacitance.

The input signal generator preferably outputs a sinusoidal wave of a specific frequency. In this case, harmonics or high frequencies are not overlapped with a basic frequency, which is used for detection, in the output of the input signal generator. Therefore, it is easy to distinguish it from the high frequency component when plasma or spatter is generated in laser beam machining, thereby heighten reliability in distance measurement. Moreover, since the input signal is the sinusoidal wave, it can easily detect or shift the phase.

The computing unit may detect a phase of the input signal and synchronously rectify the detection signal on the basis of the phase of the input signal. In this case, such synchronous rectification can extract a component originated by the input signal from the detection signal. Then, it is possible to restrain influences of disturbance by plasma or spatter overlapped with a base frequency. Moreover, it is possible to adjust sensitivity in the synchronous rectification by controlling the phase of the detection signal and the input signal. Naturally, the sensitivity can be optimal.

The computing unit may have a multiplying circuit and a smoothing circuit. The multiplying circuit multiplies the input signal and the detection signal. The smoothing circuit smoothes an output of the multiplying circuit. In this case, the multiplying circuit multiplies the detection signal and the input signal, thereby outputting a multiplying result of large amplitude for use in detection. Therefore, it is possible to keep down noise due to influences of plasma or spatter as a whole. Consequently, a correct detection output can be obtained as a distance information output.

The computing unit may sample the detection signal on the basis of a timing or a phase of the input signal, thereby computing the detection signal to generate the distance information output. In this ease, it is possible to sample the input signal in a desired range at a desired timing. Therefore, if an area with a large amplitude is set as a sampling area, SN ratio becomes relatively large, accordingly. Moreover, the sampling area can be changed by phase shifting, thereby controlling output sensitivity.

The computing unit may further have a phase shifting circuit. The computing unit shifts and controls a phase of the input signal by the phase shifting circuit so as to compute the detection signal on the basis of a phase-controlled input signal. In this case, it is possible to make the input signal in-phase with the detection signal by the phase shifting circuit, thereby efficiently removing disturbance of high frequency induced by plasma or spatter in laser beam machining. Moreover, the computing unit can control the phase difference between the input signal applied to the sensing electrode and the detection signal detected thereat. Namely, it can correct phase difference between the detection signal and input signal. Therefore, it is possible to control sensitivity in detection or in computation of a synchronous rectification, multiplication, sampling or the like, by such phase control. Thus, the sensitivity can be optimal.

The computing unit may further have a phase shifting circuit. The computing unit shifts and controls a phase of the detection signal by the phase shifting circuit so as to compute a phase-shifted detection signal on the basis of the input signal. In this case, it is possible to make the detection signal in-phase with the input signal by the phase shifting circuit, thereby efficiently removing disturbance of high frequency induced by plasma or spatter in laser beam machining. Moreover, the computing unit can control the phase difference between the input signal applied to the sensing electrode and the detection signal detected thereat. Namely, it can correct phase difference between the detection signal and input signal. Therefore, it is possible to control sensitivity in detection or in computation of a synchronous rectification, multiplication, sampling or the like, by such phase control. Thus, the sensitivity can be optimal.

The input signal generator may generate dual alternating signals of different phase as the input signal. One of the dual alternating signals is input into the sensing electrode. The other of the dual alternating signals is input into the computing unit. In this case, it is possible to make in-phase the detection signal and the signal input into the computing unit from the input signal generator without a phase shifting circuit. Therefore, a circuit configuration can be simple. Moreover, it is possible to optimally control an output in computation of a Asynchronous rectification, multiplication, sampling or the like.

Further objects and advantages of the invention will be apparent from the following description, reference being had to the accompanying drawings, wherein preferred embodiments of the invention are clearly shown.

BRIEF DESCRIPTION OF THE SEVERAL VIEW OF THE DRAWINGS

Figure 4:
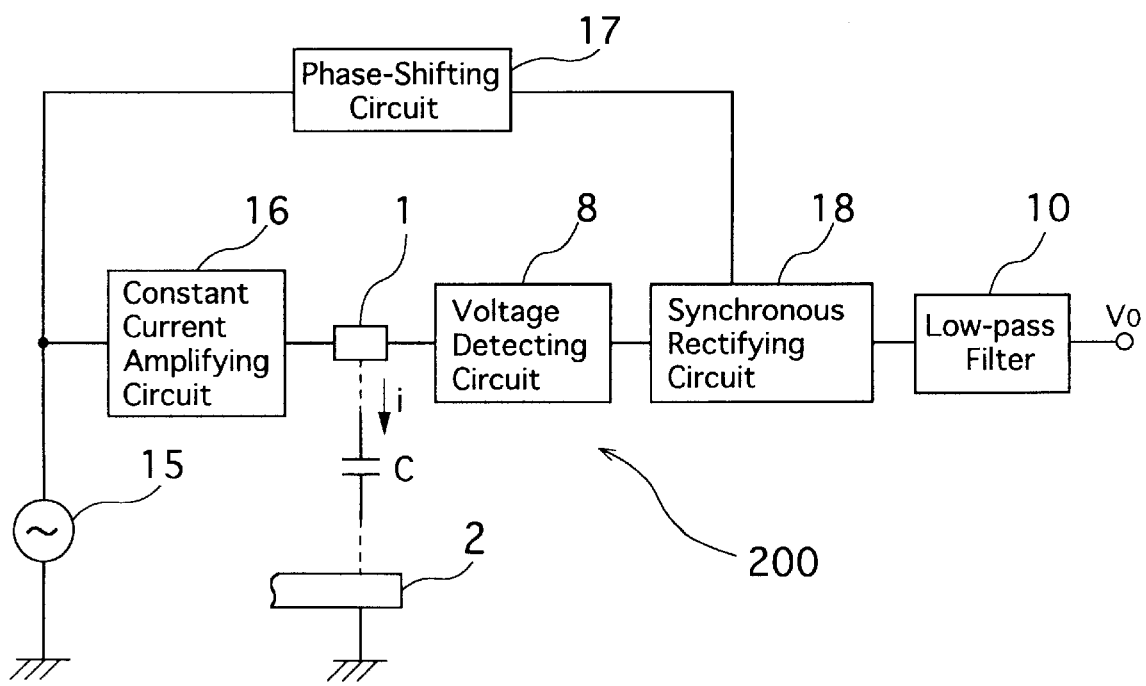
FIG. 4 is an explanatory view showing an overall structure of a distance detector for laser beam machine according to a second embodiment of the invention.

FIG. 5a to FIG. 5e exemplify waveforms in an operation of the distance detector of FIG. 4.

Figure 6:
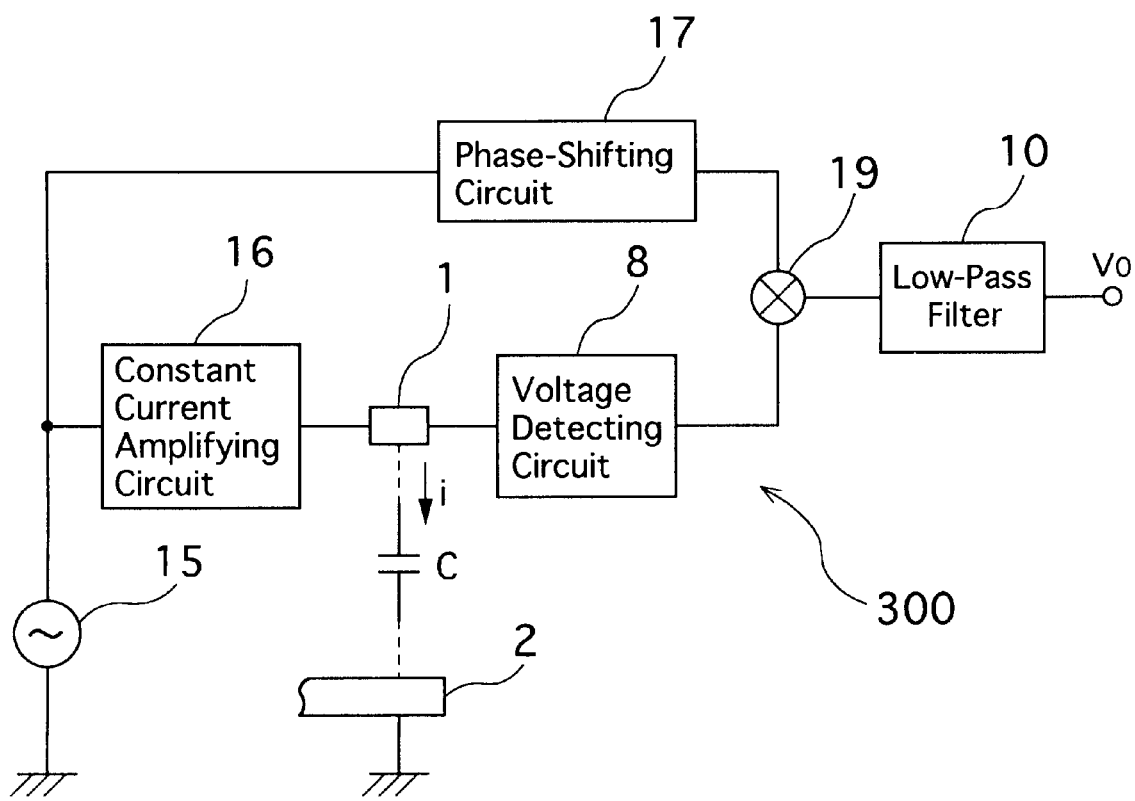

FIG. 6 is an explanatory view showing an overall structure of a distance detector for laser beam machine according to a third embodiment of the invention.

FIG. 7a to FIG. 7d exemplify waveforms in an operation of the distance detector of FIG. 6.

Figure 8:
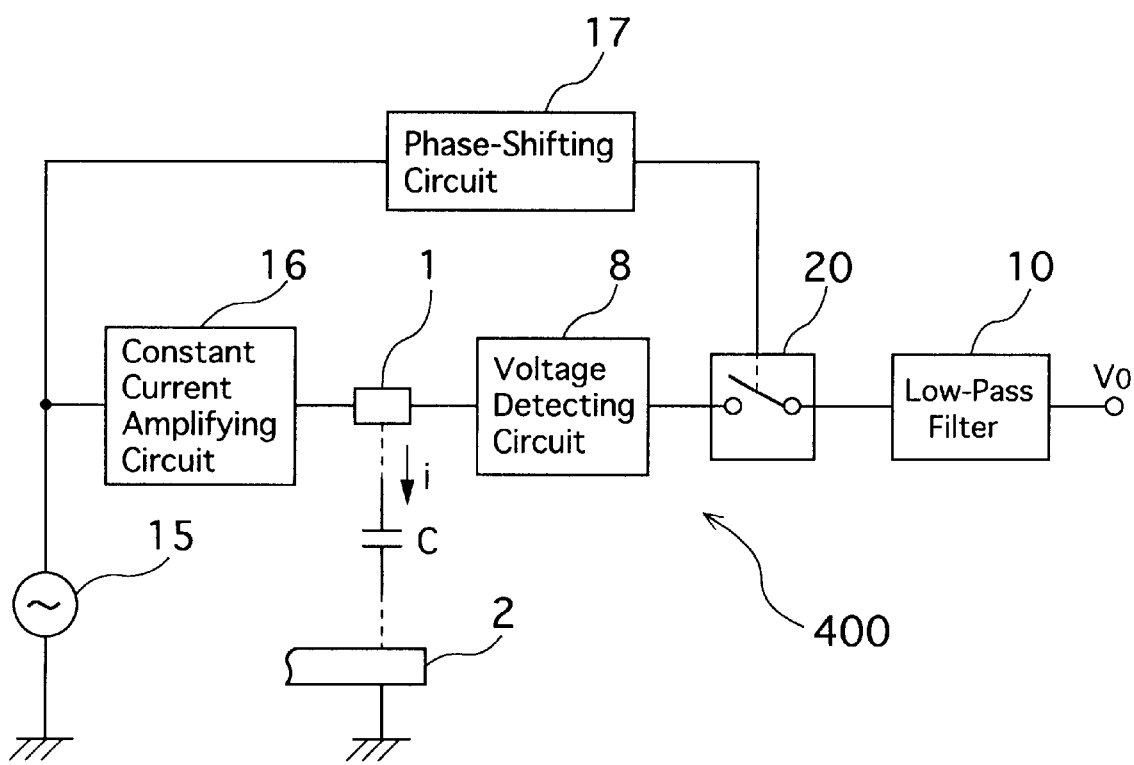

FIG. 8 is an explanatory view showing an overall structure of a distance detector for laser beam machine according to a fourth embodiment of the invention.

FIG. 9a to FIG. 9d exemplify waveforms in an operation of the distance detector of FIG. 8.

Figure 10:
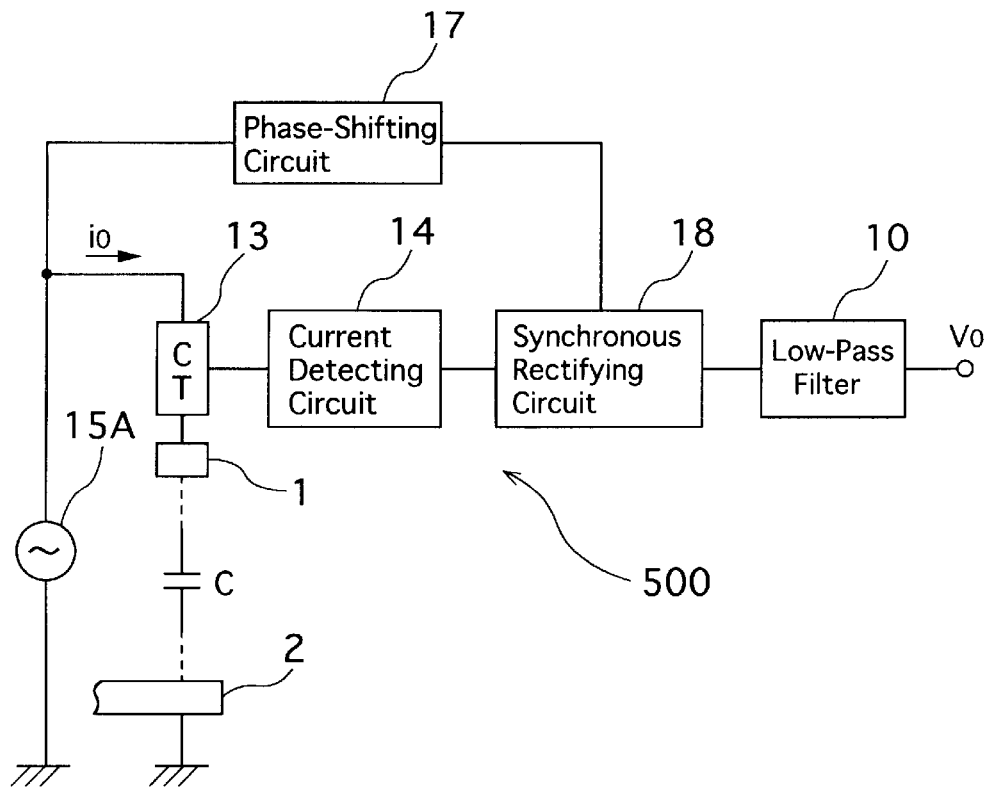

FIG. 10 is an explanatory view showing an overall structure of a distance detector for laser beam machine according to a fifth embodiment of the invention.

Figure 11:
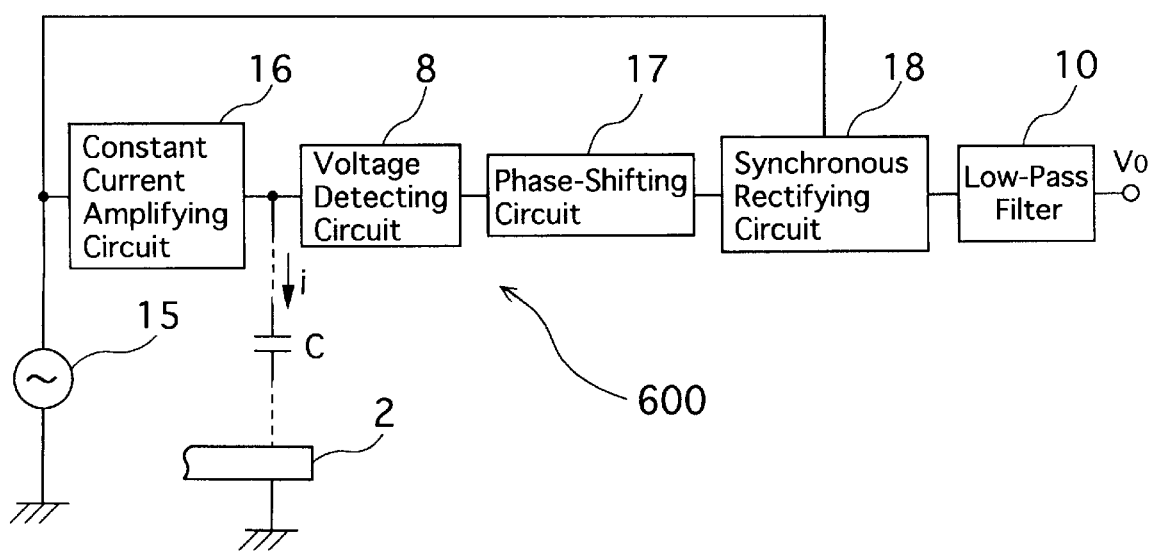

FIG. 11 is an explanatory view showing an overall structure of a distance detector for laser beam machine according to a sixth embodiment of the invention.

Figure 12:
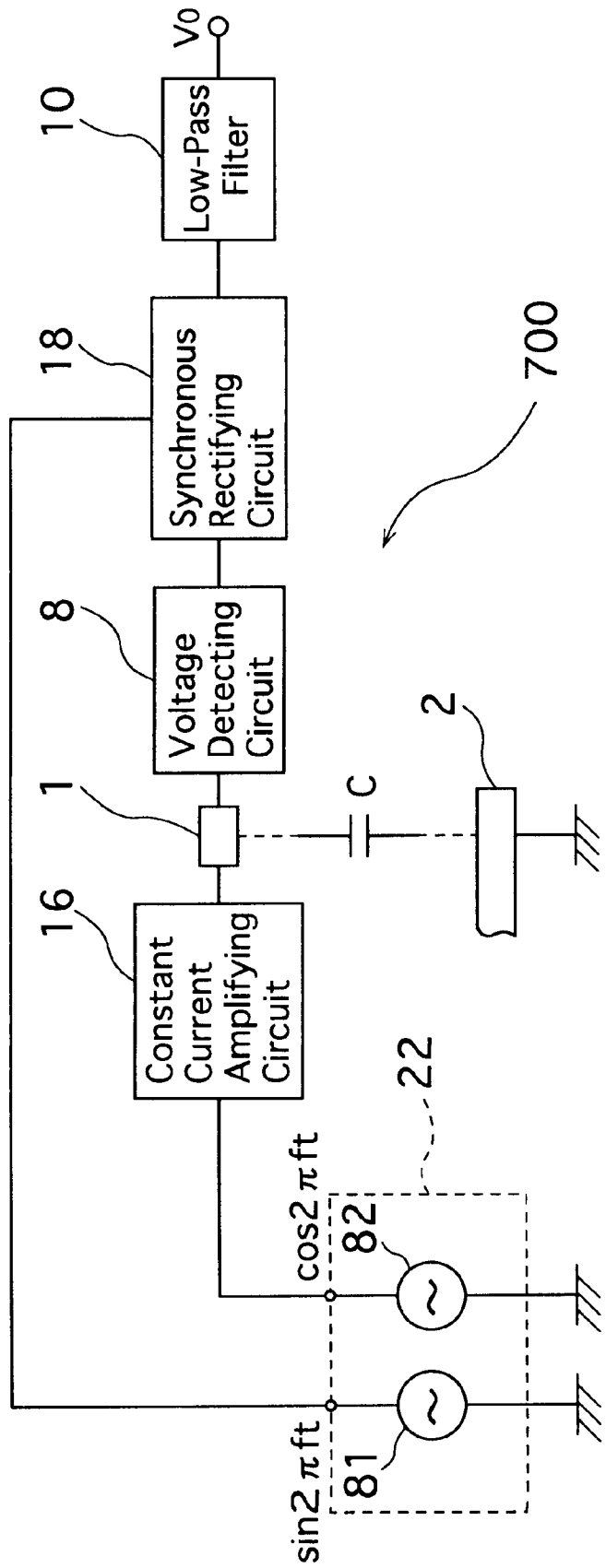

FIG. 12 is an explanatory view showing an overall structure of a distance detector for laser beam machine according to a seventh embodiment of the invention.

Figure 13:
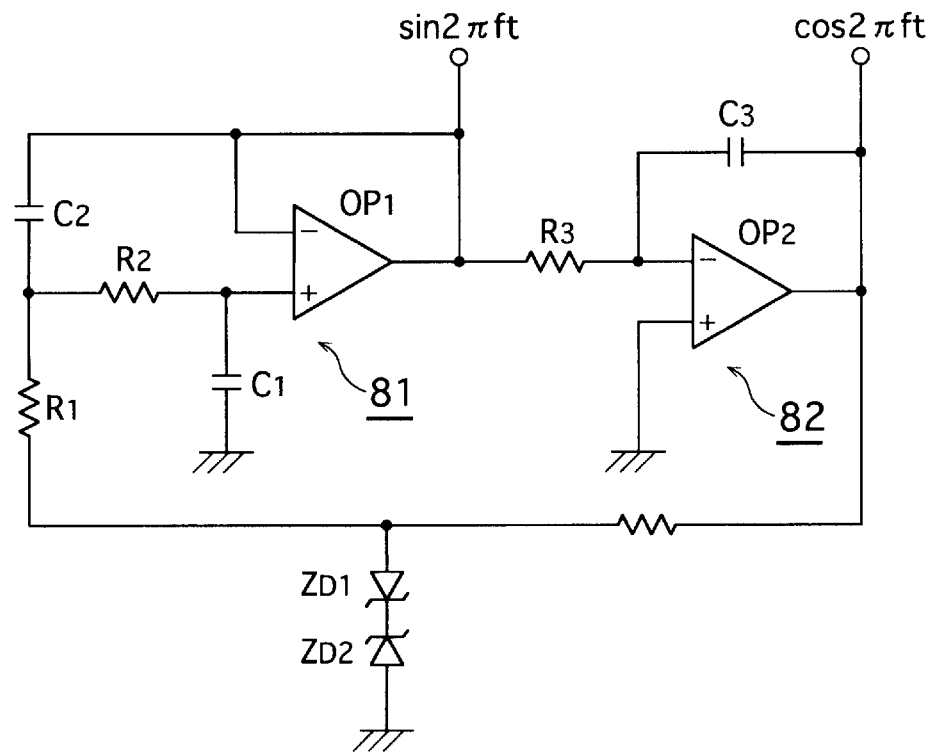

FIG. 13 is a diagram showing a sinusoidal wave oscillating circuit in the distance detector of FIG. 12.

Figure 14:
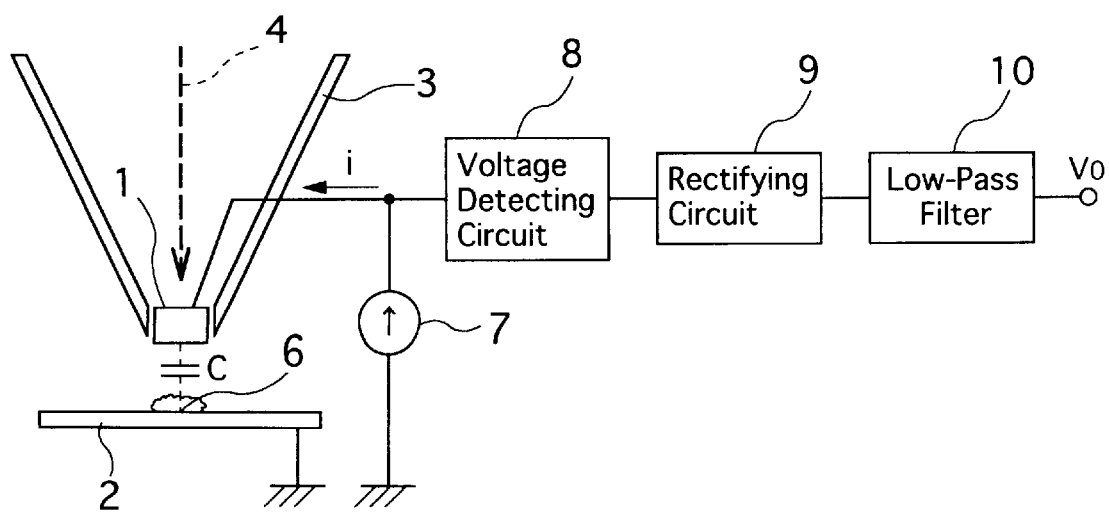

FIG. 14 is an explanatory view showing an overall structure of a distance detector for laser beam machine according to a first conventional art.

Figure 15:
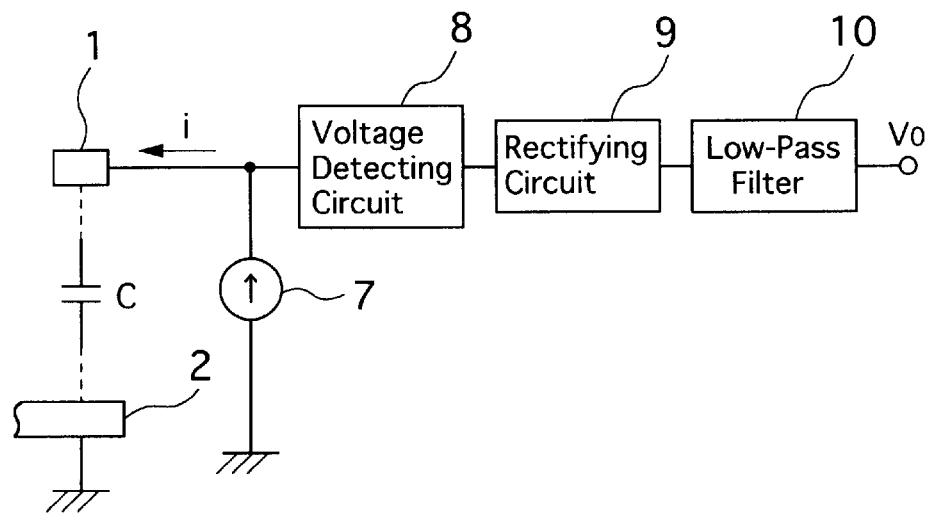

FIG. 15 is an explanatory view schematically showing an overall structure of a distance detector for laser beam machine according to the first conventional art.

Figure 16:
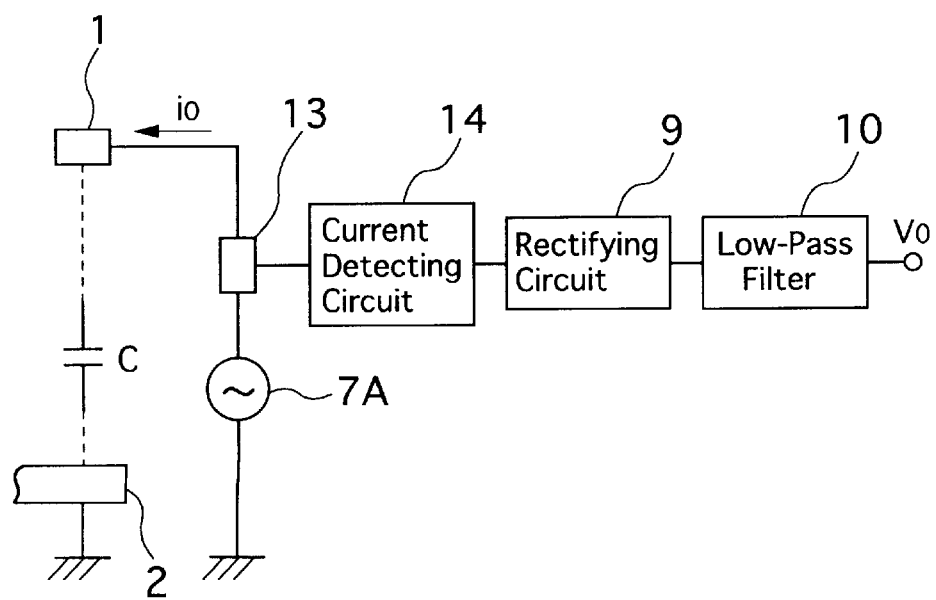

FIG. 16 is an explanatory view schematically showing an overall structure of a distance detector for laser beam machine according to the first conventional art.

DETAILED DESCRIPTION OF THE INVENTION

Several embodiments of the invention are described hereunder referring to the attached drawings. The same reference character or numeral is attached to the same element as the conventional one shown in FIG. 14 to FIG. 16. Moreover, the same reference character or numeral is used to show the same element throughout the several embodiments.

Figure 1:
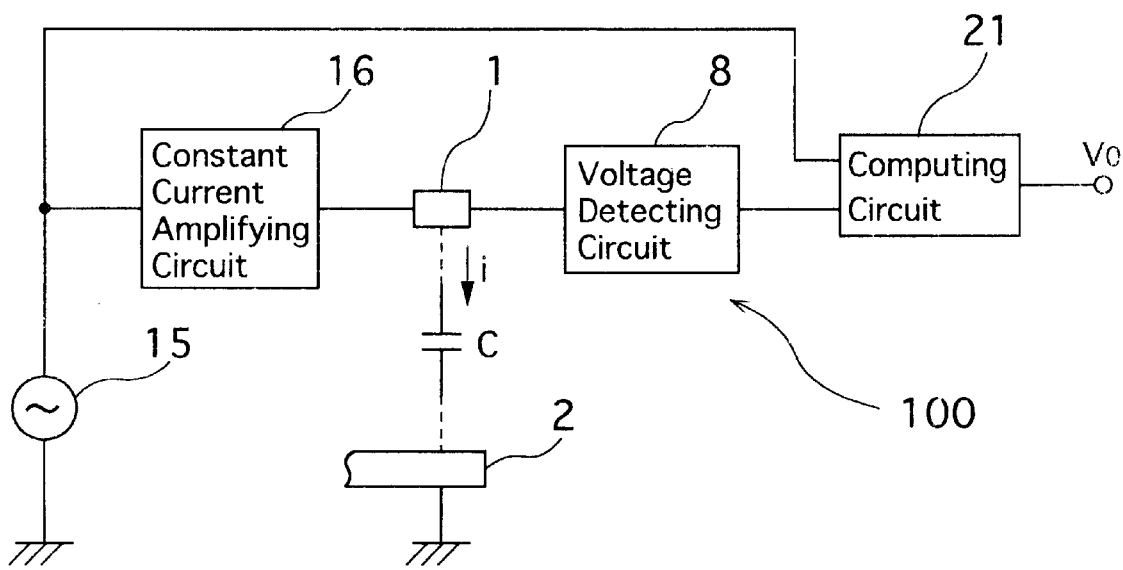
FIG. 1 is an explanatory view showing an overall structure of a distance detector for laser beam machine according to a first embodiment of the invention.

FIG. 1 illustrates an overall structure of a distance detector 100 for laser beam machining according to a first embodiment of the invention.

Referring to FIG. 1, the distance detector 100 is adapted to the laser beam machine. The laser beam machine 100 condense a laser beam 4 emitted from a laser oscillator by an optical condenser. It detects a distance between a focal position 6 and a workpiece 2 by the distance detector using a capacitance C. Then, the laser beam machine irradiates the condensed laser beam on the workpiece 2 for laser machining, while controlling the distance between the focal position 6 and the workpiece 2. The distance detector 100 has a sensing electrode 1, an input signal generator composed of an alternating voltage source 15 and a constant current amplifying circuit 16, a signal detector composed of a voltage detecting circuit 8, and a computing unit composed of a computing circuit 21. The sensing electrode 1 forms the capacitance C relative to the workpiece 2. The input signal generator generates an alternating signal (alternating current) that is input into the sensing electrode 1, as an input signal. Then the alternating current is applied between the sensing electrode 1 and workpiece 2 and transformed by the capacitance C into a voltage (voltage drop) applied to the sensing electrode 1. The signal detector 8 detects such alternating signal (voltage) as a detection signal.

While the alternating voltage source 15 is used as a constant voltage source, the alternating voltage source 15 may be any type of sine-wave oscillator that has a stable frequency and voltage amplitude. The constant current amplifying circuit 16 outputs a constant alternating current proportional to an input voltage. The computing circuit 21 is composed of an operational amplifier and so on. The computing circuit 21 receives the alternating signal generated at the input signal generator 15, 16 as a reference signal. Then, the computing circuit 21 extracts a component having a same frequency as the reference signal out of the detection signal, to define a correlated component. Thus, the computing circuit 21 computes the extracted correlated component into an output representing the distance between the focal position 6 and the workpiece 2.

In the distance detector 100, the voltage source 15 generates an alternating voltage $V\sin 2\pi ft$. The amplifying circuit 16 receives such voltage and outputs a constant alternating current i proportional to the input voltage, thereby supplying the current i to the sensing electrode 1. At this time, a voltage of the sensing electrode 1 is applied to the voltage detecting circuit 8. However, an input impedance of the detecting circuit 8 is very large. Particularly, the input impedance of the detecting circuit 8 is nearly infinitely large compared with a reactance of the capacitance C at the sensing electrode 1. Therefore, a value of a current flowing into the detecting circuit 8 can be ignored. Namely, the sensing electrode 1 receives substantially all of the alternating current i output from the amplifying circuit 16. An alternating voltage Vc is generated at the sensing electrode 1 in accordance with the supplied current i and the capacitance C. The relation is expressed by the following equation.

$$Vc = i/2\pi fC$$

The detecting circuit 8 detects and amplifies such alternating voltage Vc, thereby outputting an alternating signal as the detection signal. The detection signal is input into the computing circuit 21. The computing circuit 21 also receives an alternating signal output from the voltage source 15 as the reference signal. Then, the computing circuit 21 computes these two alternating signals to provide a correct sensed output Vo as a distance information output.

Figure 2:
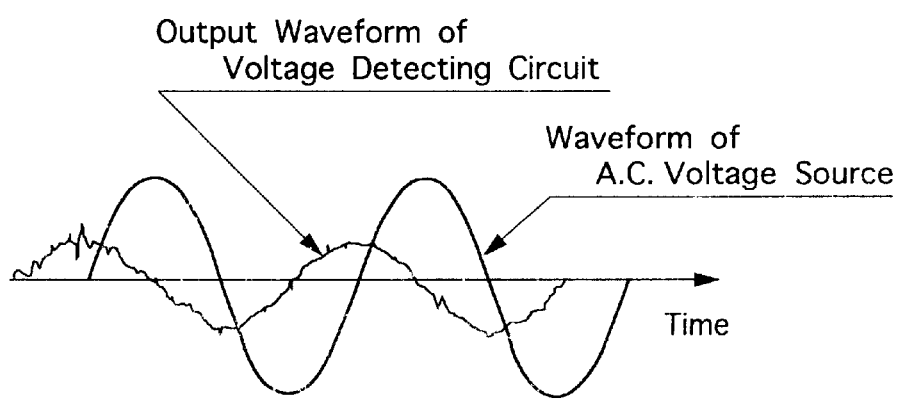
FIG. 2 is a chart exemplifying an output waveform of an alternating voltage source and an output waveform of a voltage detecting circuit in the distance detector of FIG. 1.
Figure 3:
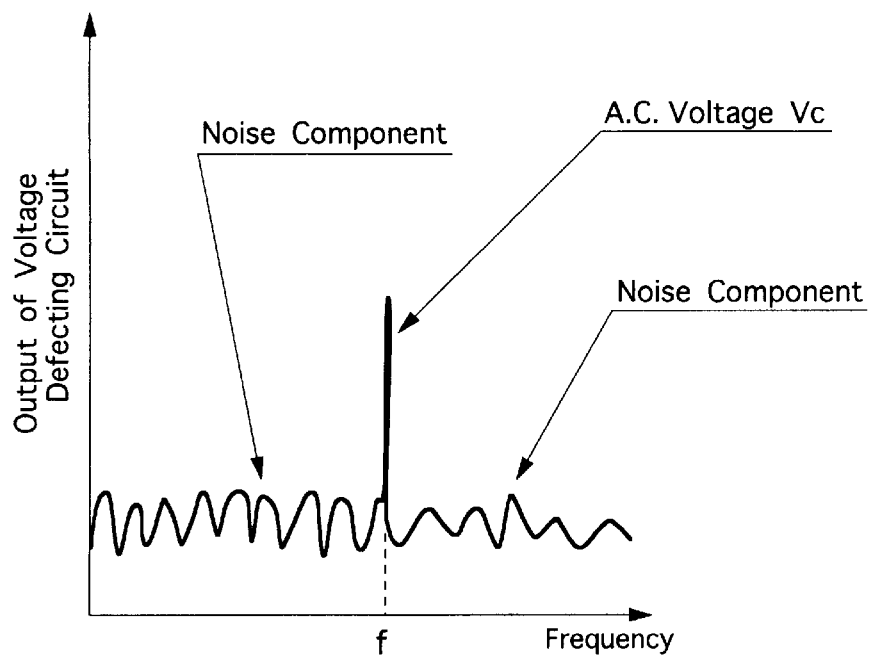
FIG. 3 is a chart exemplifying a frequency spectrum of an output signal from the voltage detecting circuit in the distance detector of FIG. 1.

FIG. 2 exemplifies an output waveform of an alternating voltage source and an output waveform of a voltage detecting circuit in the distance detector of FIG. 1. FIG. 3 exemplifies a frequency spectrum of an output signal from the voltage detecting circuit in the distance detector of FIG. 1.

The computing circuit 21 extracts a correlated component out of the alternating signal received from the detecting circuit 8, namely, a component having correlation with a waveform of the output signal form the voltage source 15. Then, the computing circuit 21 computes amplitude of such correlated component. For example, in case a sine-current is used as an output signal of the voltage source 15, the detecting circuit 8 outputs an alternating signal containing a noise component as shown in FIG. 2. It is the fact experientially confirmed. However, the computing circuit 21 outputs only the amplitude of the sine-wave component of the same frequency as the signal from the voltage source 15, in the signal from the detecting circuit 8. Namely, if a spectrum (frequency component) of noise is contained in the signal from the detecting circuit 8 as shown in FIG. 3, the computing circuit 21 can extract only a spectrum of the same frequency as the signal generated at the voltage source 15. Namely, only the signal necessary for detecting the capacitance C is extracted out of the output signal from the detecting circuit 8. It means that the computed output eliminates a noise component out of the alternating voltage Vc proportional to the capacitance C generated at the electrode 1, since the noise has no correlation with the output of the voltage source 15. Therefore, even if plasma or spatter takes place during the laser machining, the distance measurement is not affected by such factor. Thus, it is possible to provide the distance detector 100 of high reliability.

A variety of computing units corresponding to the computing circuit 21 is specifically described hereunder in the following embodiments. For example, a phase sensitive detector circuit may be used as the computing unit, while a synchronous rectifying circuit may be used as the phase sensitive detector. Instead, a multiplying circuit may be used as the computing unit. Moreover, a sampling circuit may be used as the computing unit. Any kind of computing unit may be used as long as it extracts and computes to output a component of the same frequency as the output of the alternating signal source, out of the sensed output from the detecting circuit for the sensing electrode 1. In addition, the computing unit may have a phase shifting circuit in combination with the synchronous rectifier or the like. Then, the synchronous rectification or the like is performed after the output signals of the alternating signal source and detecting circuit are made in-phase. In this case, it is possible to improve sensitivity of the sensed output at the computing unit, thereby enlarging SN ratio of the sensed output Vo.

FIG. 4 illustrates an overall structure of a distance detector 200 for laser beam machine according to a second embodiment of the invention.

In the distance detector 100 shown in FIG. 1, where the output signals of the detecting circuit 8 and voltage source 15 are not in-phase, the detecting sensitivity may be lower, thereby lessening the SN ratio. Here, the output signal from the detecting circuit 8 has a high frequency and used to measure the capacitance C between the electrode 1 and workpiece 2. Moreover, an amplification time of the detecting circuit 8 does not sometimes agree with a timing at which the output signal of the voltage source 15 is introduced directly in the computing circuit 21. In this case, it is preferable that the output signals have phases adjusted so that they are in-phase, as shown in the second embodiment shown in FIG. 4

The distance detector 200 of the second embodiment is applied to the laser beam machine as in the first embodiment. The distance detector 200 detects a distance of the focal position 6 and the workpiece 2. The distance detector 200 has the sensing electrode 1, the alternating voltage source 15, the constant current amplifying circuit 16, the voltage detecting circuit 8, a phase shifting circuit 17 and a synchronous rectifying circuit 18.

In the second embodiment, the alternating voltage source 15 is used as a reference waveform generating source as in the first embodiment. The phase shifting circuit 17 shifts the phase of the alternating signal from the voltage source 15, thereby output it while advancing or lagging the phase. The synchronous rectifying circuit 18 receives the output signal passed through the phase shifting circuit 17 as a synchronizing signal (reference signal). Then, the rectifying circuit 18 rectifies the output signal (detection signal) of the detecting circuit 8 in synchronization with the phase-shifted output signal of the voltage source 15. Moreover, the low pass filter 10 is connected to the rectifying circuit 18 so as to smooth the synchronously rectified detection signal.

A computing unit of the second embodiment is composed of the phase shifting circuit 17 and the synchronous rectifying circuit 18. The computing unit 17, 18 also extracts and computes a component having a same frequency as the reference signal, out of the detection signal, while making them in-phase. Namely, the computing unit extracts and outputs only a frequency component correlated with the output of the voltage source 15, from the output of the detecting circuit 8. At this time, it removes an unnecessary high frequency component and noise component. Moreover, the low pass filter 10 cuts off an unnecessary high frequency component and noise component that is included or has not been removed in the rectifying circuit 18.

Also in the second embodiment, the sensing circuit 1 is supplied with a constant alternating current i proportional to the output voltage of the voltage source 15, as in the first embodiment. Then, the voltage $Vc=i/2\pi fC$ of the electrode 1 is input into the rectifying circuit 18. On the other hand, the phase shifting circuit 17 shifts the phase of the alternating voltage signal of the voltage source 15, then inputting it in the rectifying circuit 18. The rectifying circuit 18 synchronously rectifies the detection signal of the detecting circuit 8 on the basis of the phase information of the signal from the phase shifting circuit 17. Namely, the detection signal of the detecting circuit 8 is in-phase with the reference signal of the voltage source 15 passed through the phase shifting circuit 17. Therefore, the rectifying circuit 18 rectifies only the signal of the same frequency as the in-phase reference signal. In other words, only the component corresponding to the value of the capacitance C is extracted from the detection signal, while the other high frequency component being removed. Such rectified detection signal is sufficiently large and the sensitivity improves. The low pass filter 10 receives the output of the rectifying circuit 18 to further remove the unnecessary high frequency component.

As mentioned above, it is possible to perform the synchronous rectification, while making same the frequency and phase of the detection output of the detecting circuit 8 and the output of the voltage source 15. Therefore, if a noise component is mixed in the signal sensed at the sensing electrode 1 and overlapped with the detection output of the detecting circuit 8, the frequency of such noise component does not agree with the frequency of the detection output. Then, such noise can be removed in the rectifying circuit 18. As a result, the detection can be made eliminating the influence of the noise component. Consequently, a correct detection output Vo can be obtained as a distance information output.

The computing unit is described in detail hereunder. The synchronous rectifying circuit 18 turns on and off a switching element such as FET in synchronization with the output from the voltage source as a synchronizing signal, for example. Thus, the rectifying circuit 18 extracts a desired phase portion of the output waveform of the detecting circuit 8. Namely, the rectifying circuit 18 makes the switching element on when the output of the voltage source 15 is positive, thereby only extracting the output of the detecting circuit 8 at that time. Then, the low pass filter 10 smoothes the output of the rectifying circuit 18, thereby outputting a dc voltage Vo. At this time, the low pass filter 10 integrates the output signals of the detecting circuit 8 and voltage source 15, thereby outputting a voltage Vo corresponding to the phase difference ø as the detection output. For example, when the phase difference ø is zero, the detection output becomes maximum according to the amplitude of the output of the detecting circuit 8. When the phase difference ø is π/2, the output value becomes zero. Here, the outputs are in-phase, so that the low pass filter 10 generates the maximum value.

The rectifying circuit 18 is capable of detecting the phase difference ø, using the fact that it outputs zero value when the phase difference ø is zero. Therefore, in the second embodiment, it is possible to shift the phase of the output signal of the voltage source 15 by the phase shifting circuit 17 referring to the phase difference ø detected at the rectifying circuit 18. Thus, it becomes in-phase with the output signal of the detecting circuit 8, too.

FIG. 5*a* to FIG. 5*e* exemplify waveforms in an operation of the distance detector 200 of the second embodiment.

Figure 5A:
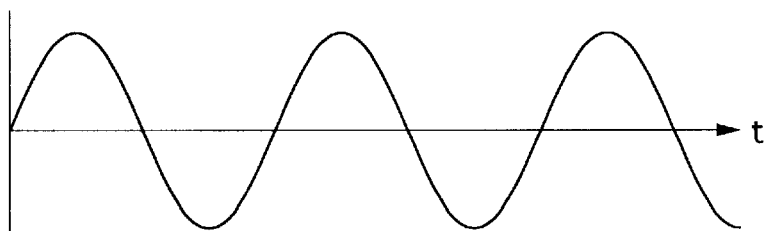
Figure 5B:
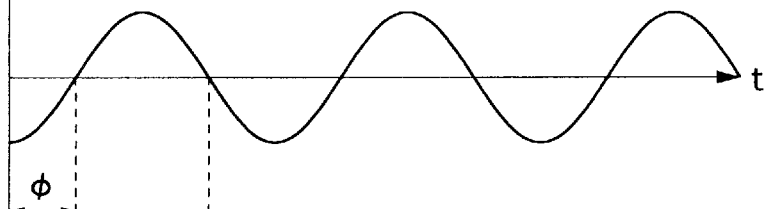
Figure 5C:
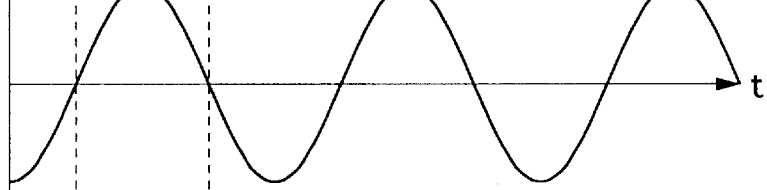
Figure 5D:
Figure 5E:

FIG. 5*a* and FIG. 5*b* show the case in which the phase of an output V8 of the detecting circuit 8 lags behind an output V15 of the voltage source 15 by a phase difference ø. Then, the distance detector 200 delays the phase of the output V15 by such phase difference ø via the phase shifting circuit 17, as shown in FIG. 5*c*. Thereby, the output V8 undergoes the synchronous rectification while being made in-phase with an output V17 of the phase shifting circuit 17. Then, an output V18 of the rectifying circuit 18 and an output V10 of the low pass filter 10 become as shown in FIG. 5*d* and FIG. 5*e*. The low pass filter 10 outputs a dc voltage Vo of a value corresponding to the capacitance C. At this time, a high frequency component (harmonics) and noise component overlapped with the detection output V8 have different frequencies from the frequency of the output V15 of the voltage source 15 or output V17 of the phase shifting circuit 17. Namely, they are not correlated therewith. Therefore, they are removed by the rectifying circuit 18 first, then further cut off by the low pass filter 10.

FIG. 6 illustrates an overall structure of a distance detector 300 for laser beam machine according to a third embodiment of the invention.

The distance detector 300 shown in FIG. 6 uses a multiplying circuit 19 in place of the synchronous rectifying circuit 18 in the distance detector 200 shown in FIG. 4. As in the second embodiment, the distance detector 300 adjusts the phases of the output signals of the detecting circuit 8 and voltage source 15. Then, the output signals are made in-phase and input into the multiplying circuit 19.

A computing unit of the third embodiment is composed of the phase shifting circuit 17 and the multiplying circuit 19. The computing unit 17, 19 also extracts and computes a component having a same frequency as the reference signal, out of the detection signal, while making them in-phase.

Also in the third embodiment, the multiplying circuit 19 receives the output signal of the detecting circuit 8. The multiplying circuit 19 multiplies the outputs of the detecting circuit 8 and voltage source 15, on the basis of the information of the output of the voltage source 15 that has been made in-phase by the phase shifting circuit 17. Namely, the multiplying circuit 19 multiplies the signals of large amplitude, thereby supplying the output into the low pass filter 10. Consequently, it can restrain or decrease the noise as a whole, so that a correct detection output Vo is obtained as a distance information output.

Therefore, the computing operation of the multiplying circuit 19 lessens the influence caused by plasma or spatter in the disturbance, compared with the influence of the entire disturbance. Accordingly, if there take place plasma or spatter during laser machining, the distance measurement is not affected thereby. Thus, it is possible to provide a distance detector of high reliability.

The computing unit is described in detail hereunder. The multiplying circuit 19 multiplies the output signal of the detecting circuit 8 with the phase-shifted output signal of the voltage source 15. Thus, the multiplied output is obtained. Since the high frequency component or noise component has frequencies different from the frequency of the output of the voltage source 15, they are removed thereat. The low pass filter 10 further cuts off a unnecessary high frequency component and noise component. It also smoothes the multiplied output, thereby outputting a dc voltage Vo. At this time, the low pass filter 10 outputs a voltage Vo corresponding to the phase difference ø between the detection signal and reference signal. For example, when the phase difference ø is zero, the detection output becomes maximum according to the amplitude of the output of the detecting circuit 8. When the phase difference ø is π/2, the output value becomes zero. Here, the outputs are in-phase, the low pass filter 10 generates the maximum value.

As in the second embodiment, it is possible to shift the phase of the output signal of the voltage source 15 by the phase shifting circuit 17 referring to the phase difference ø detected at the multiplying circuit 19. Thus, it becomes in-phase with the output signal of the detecting circuit 8, too.

FIG. 7a to FIG. 7d exemplify waveforms in an operation of the distance detector 300 of the third embodiment.

Figure 7A:
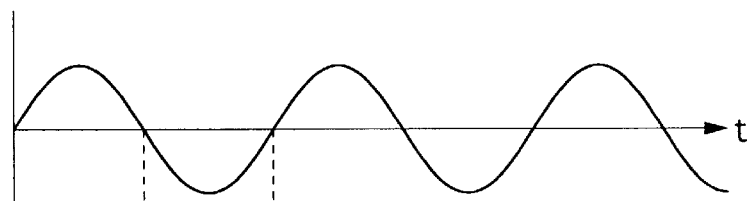
Figure 7B:
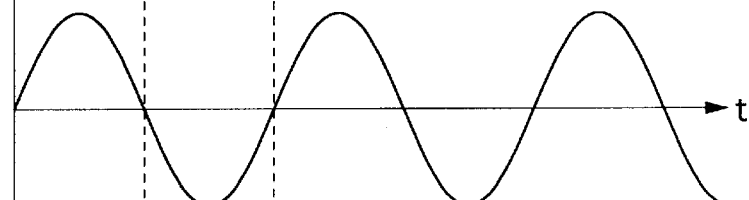
Figure 7C:
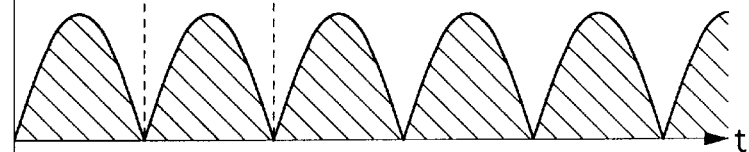
Figure 7D:
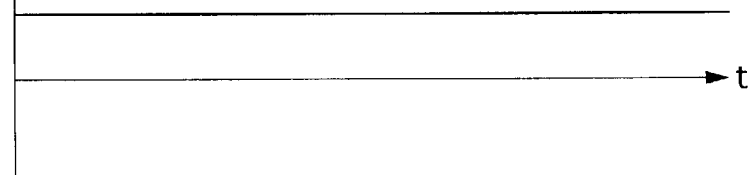

As shown in FIG. 7a and FIG. 7b, the phase of an output V8 of the detecting circuit 8 is made in-phase with an output V17 of the voltage source 15 that has passed the phase shifting circuit 17. Then, the outputs V8 and V17 are multiplied. Thus, an output V19 of the multiplying circuit 19 and an output V10 of the low pass filter 10 become as shown in FIG. 7c and FIG. 7d. The low pass filter 10 outputs a dc voltage Vo of a value corresponding to the capacitance C. At this time, a high frequency component and noise component overlapped with the detection output V8 have different frequencies from the frequency of the output V15 or output V17 of the voltage source 15. Namely, they are not correlated therewith. Therefore, they are removed by the multiplying circuit 19 first, then further cut off by the low pass filter 10. In addition, since the output V8 and output V15 (V17) are multiplied, the detector 200 can generate a larger detection output.

FIG. 8 is an explanatory view showing an overall structure of a distance detector 400 for laser beam machine according to a fourth embodiment of the invention.

The distance detector 400 shown in FIG. 8 uses a sampling circuit 20 in place of the synchronous rectifying circuit 18 in the distance detector 200 shown in FIG. 4. For example, the sampling circuit 20 is composed of an analog gate, threshold circuit for opening and closing the gate at a fixed period, and the like. As in the second embodiment, the distance detector 400 adjusts the phases of the output signals of the detecting circuit 8 and voltage source 15. Then, the output signals are made in-phase and input into the sampling circuit 20.

A computing unit of the fourth embodiment is composed of the phase shifting circuit 17 and the sampling circuit 20. The computing unit 17, 20 also extracts and computes a component having a same frequency as the reference signal, out of the detection signal, while making them in-phase.

Also in the fourth embodiment, the sampling circuit 20 receives the output signal of the detecting circuit 8. The sampling circuit 20 samples the detection output of the detecting circuit 8 at a fixed period, on the basis of the information of the output of the voltage source 15 that has been made in-phase by the phase shifting circuit 17. For example, the sampling is carried out at such a period and for such a sampling time as to extract part of the detection output that has one fifth or more of the maximum amplitude. The sampling output is supplied into the low pass filter 10 to remove an unnecessary high frequency component. Consequently, a correct detection output Vo is obtained as a distance information output.

Namely, the sampling circuit 20 samples only a portion of desired phase, e.g. a portion of a phase having large amplitude at a fixed period, from a voltage detected by the detecting circuit 8. In other words, the sampling circuit 20 samples only a portion having a large SN ratio.

As mentioned above, the signal of the voltage source 15 has a phase shifted through the phase shifting circuit 17 and introduced into the sampling circuit 20. Moreover, the sampling circuit 20 samples the detection signal of the detecting circuit 8 within a desired range, referring to the phase of the signal of the voltage source 15. Accordingly, the SN ratio can be relatively enlarged by adjusting the sampling area. Moreover, a period of a noise component does not match with the sampling timing or sampling period (output frequency of the voltage source 15). Therefore, the noise component is removed in the low pass filter 10, so that the SN ratio improves more. Namely, the sampling circuit 20 detects only the frequency component near the sampling frequency and its higher harmonics.

It is possible to change the sampling area to adjust the output sensitivity by appropriately controlling the phase shifting amount at the phase shifting circuit 17. However, if the outputs of the detecting circuit 8 and voltage source 15 are in-phase as mentioned above, the output sensitivity is optimal.

The computing unit is described in detail hereunder. The sampling circuit 20 samples the output signal of the detecting circuit 8 in synchronization with the phase-shifted output signal of the voltage source 15. Since the high frequency component or noise component has frequencies different from the frequency of the output of the voltage source 15, they are removed thereat. The low pass filter 10 further cuts off a unnecessary high frequency component and noise component. It also smoothes the sampling output, thereby outputting a dc voltage Vo. At this time, the low pass filter 10 outputs a voltage Vo corresponding to the phase difference ø between the detection signal and reference signal. For example, when the phase difference ø is zero, the detection output becomes maximum. When the phase difference ø is π/2, the output value becomes zero. Here, the outputs are in-phase, the low pass filter 10 generates the maximum value.

As in the second embodiment, it is possible to shift the phase of the output signal of the voltage source 15 by the phase shifting circuit 17 referring to the phase difference ø detected at the sampling circuit 20. Thus, it becomes in-phase with the output signal of the detecting circuit 8, too.

FIG. 9a to FIG. 9d exemplify waveforms in an operation of the distance detector 400 of the fourth embodiment.

Figure 9A:
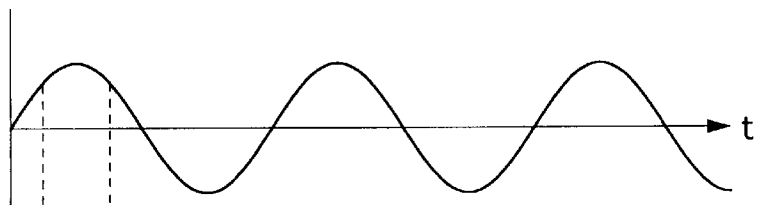
Figure 9B:
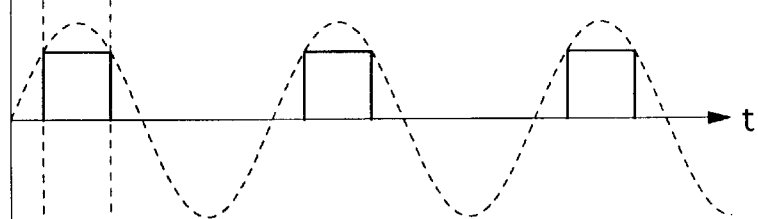

In the distance detector 400, the output V8 of the detecting circuit 8 is sampled while made in-phase with the output V17 of the voltage source 15 that has passed the phase shifting circuit 17. At this time, the sampling circuit 20 samples the output V8 on the basis of the phase or a predetermined timing of the output V17. For example, as shown in FIG. 9a and FIG. 9b, the sampling circuit 20 generates sampling pulses with a fixed width having the same frequency as that of the output V8, V17. Moreover, it is preferable to set timings of a rise and fall of the sampling pulse so as to extract a center part of the amplitude of the output V8, namely only a portion of the signal having large SN ratio. For example, the threshold circuit controls the analog gate for sampling, while setting one fifth or more of the maximum amplitude value as a threshold.

Figure 9C:
Figure 9D:
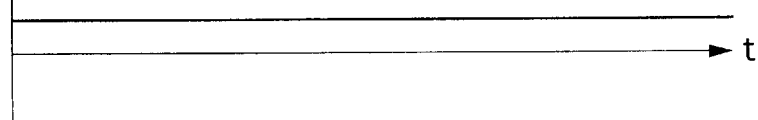

Thus, the an output V20 of the sampling circuit 20 and an output V10 of the low pass filter 10 become as shown in FIG. 9c and FIG. 9d. The low pass filter 10 outputs a dc voltage Vo of a value corresponding to the capacitance C. At this time, a high frequency component and noise component overlapped with the detection output V8 have different frequencies from the frequency of the output V15 or output V17 of the voltage source 15. Namely, they are not correlated therewith. Therefore, they are removed by the sampling circuit 20 first, then further cut off by the low pass filter 10. In addition, since the output V8 is sampled only at a phase portion having large amplitude, it is possible to obtain a detection output while extracting an area having large SN ratio.

FIG. 10 illustrates an overall structure of a distance detector 500 for laser beam machine according to a fifth embodiment of the invention.

The distance detector 500 shown in FIG. 10 uses a constant alternating voltage supplied directly to the sensing electrode 1, in place of the constant alternating current i in the distance detector 200 shown in FIG. 4. A constant alternating voltage source 15A generates a constant alternating voltage output Vsin2πft. A current io is supplied to the capacitance C between the electrode 1 and the workpiece 2, according to the constant alternating voltage. A current transformer 13 detects the current io that changes its value corresponding to a value of the capacitance C. Then, a current detecting circuit 14 transforms the current io detected at the transformer 13 into a voltage proportional to the current value, thereby outputting it as a detection signal.

Here, the input signal generator is composed of the constant alternating voltage source 15A. The signal detector is composed of the current transformer 13 and current detecting circuit 14. Then, the computing unit 17, 18 also extracts and computes a component having a same frequency as the reference signal, out of the detection signal, while making them in-phase.

In the distance detector 500, the voltage source 15A applies the constant alternating voltage to the sensing electrode 1. Then, the current io is detected at the current transformer 13. Thereby, the current detecting circuit 14 outputs the voltage proportional to such current value. Thereafter, the synchronous rectifying circuit 18 receives the output of the detecting circuit 14. It synchronously rectifies the output (detection signal) of the detecting circuit 14, while extracting only a portion thereof having the same frequency and phase as those of the output reference signal) of the voltage source 15A, as in the second embodiment. Moreover, the low pass filter 10 receives the output of the rectifying circuit 18.

Accordingly, the output of the detecting circuit 14 has the same frequency and phase as those of the output of the voltage source 15A after passing the phase shifting circuit 17. Therefore, the signal input in the low pass filter 10 has no unnecessary high frequency component nor noise component therein. Moreover, the low pass filter 10 can remove the high frequency component and noise component. Consequently, a correct detection output Vo is obtained as a distance information output, while eliminating the high frequency component and noise component.

Namely, the current is supplied to the sensing electrode proportionally to the voltage of the voltage source 15A as in the second embodiment. On the other hand, the output of the rectifying circuit 18 is specified or limited by the frequency and phase of the output of the phase shifting circuit 17. Thus, only a predetermined frequency component or necessary detection output is supplied to the low pass filter 10 from the detecting circuit 14.

Therefore, unnecessary high frequency component and noise component can be removed from the output of the detecting circuit 14, because they have different frequency and phase from those of the phase-shifted output of the voltage source 15A. Accordingly, if there takes place plasma or spatter during laser machining, the distance measurement is not deteriorated by such influence. Consequently, it is possible to provide a distance detector of high reliability.

Moreover, the phase of the reference signal is shifted by a degree necessary for the synchronous rectification. Therefore, it is possible to extract only the signal, having the same frequency and phase as those specified in the phase shifting circuit 17, from the detecting circuit 14. As a result, the noise can be reduced to minimum in the detection output.

FIG. 11 illustrates an overall structure of a distance detector 600 for laser beam machine according to a sixth embodiment of the invention.

The distance detector 600 of FIG. 11 connects the phase shifting circuit 17 of the second embodiment not to the output side of the voltage source 15 but to the output side of the detecting circuit 8.

In the distance detector 600, a voltage sensed at the detecting circuit 8 is input into the rectifying circuit 18, while having its phase controlled at the phase shifting circuit 17. Namely, the detection signal of the detecting circuit 8 becomes in-phase as the signal (reference signal) generated at the voltage source 15. The rectifying circuit 18 synchronously rectifies the signal from the phase shifting circuit 17, on the basis of a phase information of the constant alternating voltage signal from the voltage source 15. Moreover, the low pass filter 10 receives the output of the rectifying circuit 18 so as to cut off unnecessary high frequency component or noise component. Consequently, a correct detection output is obtained as a distance information output.

Accordingly, the detection output of the detecting circuit 8 has the same frequency and phase as those of the output generated at the voltage source 15, after it passed through the phase shifting circuit 17. Therefore, it is possible to extract only a component having the same frequency and phase as those of the output of the voltage source 15, out of the detection output of the detecting circuit 8, as in the second embodiment. Consequently, the rectifying circuit 18 outputs a rectified output of only a predetermined frequency, which has unnecessary high frequency component or noise component eliminated, into the low pass filter 10. As a result, a correct detection output can be obtained as a distance information output.

Namely, the rectifying circuit 18 is supplied with the voltage itself detected by the detecting circuit 8 that has the phase shifted by the phase shifting circuit 17. Moreover, the voltage of the voltage source 15 is directly input into the rectifying circuit 18. The rectifying circuit 18 synchronously rectifies the detection signal of the detecting circuit 8 through the phase shifting circuit 17, on the basis of the phase information of the voltage source 15.

Therefore, high frequency component and unnecessary noise component can be removed from the detection output, because they have different frequency and phase from those of the output of the voltage source 15. Accordingly, if there takes place plasma or spatter during laser machining, the distance measurement is not deteriorated by such influence. Consequently, it is possible to provide a distance detector of high reliability. Moreover, the noise can be reduced to minimum in the detection output.

FIG. 12 illustrates an overall structure of a distance detector 700 for laser beam machine according to a seventh embodiment of the invention. FIG. 13 illustrates a sinusoidal wave oscillating circuit in the distance detector of FIG. 12.

The distance detector 700 of FIG. 12 has a common basic structure as the distance detector 200. The differences are that the distance detector 700 uses a two-line-output ac oscillating circuit 22 in place of the voltage source 15 as a power source. The oscillating circuit 22 has a cos2πft terminal and a sin2πft terminal to generate two ac signals of different phase. The cos2πft terminal is connected to the sensing electrode 1. The sin2πft terminal is connected to the synchronous rectifying circuit 18.

The oscillating circuit 22 has a circuit as shown in FIG. 3 as a specific structure.

The circuit of FIG. 13 has an operational amplifier OP1 and an operational amplifier OP2. The sin2πft terminal outputs a sine wave. The cos2πft terminal outputs a cosine wave. The operational amplifier OP1 side constitutes a secondary VCVS (voltage controlled voltage source) low pass active filter circuit 81. The operational amplifier OP2 constitutes a practical integrating circuit 82. These terminals constitute sin/cos oscillating circuit of unbalanced output.

The two-line-output ac oscillating circuit 22 operates as follows. Namely, the integrating circuit 82 generates an output with a phase delayed 270 degrees. The active filter circuit 81 generates an output of a phase delayed 90 degrees. Then, oscillation is performed by positive feedback. An oscillating frequency f is expressed by the following equation.

$$f = \tfrac{1}{2\pi}(R1 \cdot R2 \cdot C1 \cdot C2)^{\tfrac{1}{2}}$$

where C2=2C1, C1=C3, and R1=R2.

Zener diodes ZD1 and ZD2 are used to stabilize the oscillation in FIG. 13.

An input signal generator of the present embodiment is composed of the cos2πft output of the oscillating circuit 2 and constant current amplifying circuit 16. The rectifying circuit 18 constitutes a computing unit of the present embodiment. The rectifying circuit 18 extracts and computes a component having the same frequency as the sin2πft output out of the detection output. At this time, the detection output from the detecting circuit 8 and the sin2πft output are in-phase.

In the distance detector 700, the cos2πft terminal generates a constant alternating voltage Vcos2πft. The amplifying circuit 16 receives such voltage and outputs an alternating current proportional to the input voltage, thereby supplying the current to the sensing electrode 1. The voltage sensed at the detecting circuit 8 is input into the rectifying circuit 18. The rectifying circuit 18 synchronously rectifies the detection signal of the detecting circuit 8 on the basis of the phase information of the constant alternating voltage Vsin2πft generated at the sin2πft terminal. Then, the detection signal from the detecting circuit 8 is extracted on the basis of the frequency and phase of the alternating voltage at the sin2πft terminal. Therefore, it is possible to remove unnecessary high frequency component and noise component that are contained in the detection signal. Then, the low pass filter 10 receives an output of the rectifying circuit 18, thereby providing a correct detection output Vo as a distance information output.

At this time, the cos2πft output sensed at the detecting circuit 8 has the same frequency as the sin2πft output. Moreover, the phase of the cos2πft output advances 90 degrees ahead of the phase of the sin2πft output. On the other hand, the input side of the detecting circuit 8 is a capacitive circuit for detecting the capacitance C. Therefore, the voltage sensed at the detecting circuit 8 delays 90 degrees behind the power source voltage. Accordingly, the output of the detecting circuit 8 has the same frequency and phase with those of the sin2πft output at the rectifying circuit 18. Consequently, it is possible to remove unnecessary high frequency component and noise component from the output of the rectifying circuit 18, as in the second embodiment.

Namely, the inventive distance detector detects the capacitance C, so that the voltage sensed at the detecting circuit 8 delays 90 degrees behind the power source voltage. In view thereof, in the seventh embodiment, the current is supplied to the sensing electrode 1 while advanced 90 degrees beforehand at the stage of the power source. Therefore, the rectifying circuit 18 receives a detection output of a phase delayed 90 degrees, without the phase shifting circuit 17. Consequently, the detection output becomes in-phase with the power source output.

Thus, the rectifying circuit 18 extracts and rectifies a specific frequency component, thereby inputting such rectified signal into the low pass filter 10. Therefore, it is possible to remove a high frequency component and noise component, so that a correct detection output Vo can be obtained as a distance information output.

Namely, the rectifying circuit 18 can remove such unnecessary component of different frequency and phase. Thus, if there takes place plasma or spatter during laser machining, the distance measurement is not affected by such factors. As a result, it is possible to provide a distance detector of high reliability and obtain a detection output in which the noise is restrained to minimum.

Here, in order to make in-phase the sensed voltage signal and the reference signal in the rectifying circuit 18, other circuit than the unbalanced-output sin/cos oscillating circuit 22 shown in FIG. 13. For example, a balanced-output sin/cos oscillating circuit or other ac oscillating circuit may be used as long as it has two-line outputs with different phase of 90 degrees.

The above embodiments exemplify, as an input signal generator, a constant ac power source such as a constant alternating current source or the like that uses the alternating voltage source 15 or constant alternating voltage source 15A. Here, the alternating voltage source 15 constitutes the constant current source in combination with the constant current amplifying circuit 16. Still, the input signal generator may use either of the constant ac source or constant alternating voltage source.

While the output of each input signal generator is sinusoidal wave alternating current of a predetermined frequency, the invention is not limited to such sine wave. For example, a particular waveform may be used such as a triangular wave or rectangular wave. Still, if the sine wave ac of predetermined frequency is used, harmonics are not overlapped with the fundamental frequency, which is generated from the input signal generator and used for the detection. Therefore, other frequency components than the fundamental frequency component can be eliminated. Consequently, it is easy to distinguish it from the high frequency component when plasma or spatter occurs during laser machining, thereby heighten the reliability in distance measurement results. Moreover, it is easy to detect the phase or shift it if the sine wave ac is used as the input ac signal.

In the third embodiment, the computing unit is composed of the multiplying circuit 19 and low pass filter 10. Such configuration can be applied to other embodiments, too, such as the fifth to seventh embodiment. Particularly, the smoothing circuit made up of the low pass filter 10 can supply a correct distance sensing information as a dc component. Therefore, in such case, it is easy to control the laser beam machine in a variety of modes.

In the second, fifth, sixth and seventh embodiments, the computing unit detects the phase of the source output of the input signal generator, thereby synchronously rectifying the detection output according to the phase. However, such configuration can be applied to other embodiments, too, such as the first embodiment. Particularly, such computing unit configuration can make the frequency and phase identical between the detection output and source output. Then, it can extract only an input signal having a frequency and phase corresponding to those of the source output. Thus, it can remove disturbance to the detection signal that will be induced by the plasma or spatter in laser machining. Moreover, such computing unit can adjust the phase difference between the input ac signal supplied to the sensing electrode 1 and the ac signal sensed at the sensing electrode 1. Therefore, the detection sensitivity can be controlled, accordingly. Furthermore, it can correct phase difference between the detection signal and input ac signal. With such phase control, the sensitivity in computation can be adjusted in the synchronous rectification, multiplication, sampling or the like into optimal one.

In the second to fifth embodiments, the computing unit controls or shifts the phase of the ac signal generated at the input signal generator through the phase shifting circuit 17. On the other hand, in the sixth embodiment, the computing unit controls or shifts the phase of the detection signal detected at the signal detector. However, it is enough to shift the phase of either signal. Anyway, since the phase shifting circuit makes these two signals in-phase, it is possible to efficiently remove the disturbance of high frequency that is induced by the plasma or spatter in laser machining.

Of course, any know method can be used to make them in-phase by the phase shifting circuit 17, other than referring to the signal in the rectifying circuit 18, multiplying circuit 19, sampling circuit 20 or the like, as described above. Moreover, the detection signal and source signal usually have 90 degrees phase difference, as described in the seventh embodiment. Therefore, the phase shifting circuit 17 may be configured such that it shifts the phase 90 degrees. Then, the phase can be made in-phase without reference to the phase information from the rectifying circuit 18 or the like. In this case, the circuit configuration can be simplified. In this case, it may be necessary in the practical use to adjust the phase in the phase shifting circuit 17 a little to another value than 90 degrees due to factors such as frequency characteristic of the voltage detecting circuit or influence of coaxial cable. Therefore, it is preferable to determine beforehand the degree of the phase shift at the phase shifting circuit 17 in consideration of such factors.

In addition, in the second to seventh embodiments, the source output and the detection output are made in-phase. Still, even if their phases are not exactly coincident, the computing unit can extract just a component of the detection signal that is correlated with the source output, though the sensitivity lowers. Therefore, expected advantageous effects can be achieved.

In the fourth embodiment, the computing unit samples the detection signal on the basis of the timing or phase of the ac signal generated at the input signal generator. However, such sampling circuit configuration can be applied as the computing unit to other embodiments, too, such as the fifth to seventh embodiments. In this case, it is possible to extract a predetermined phase portion or amplitude out of the detection signal. Therefore, it is possible to sample a desired signal that has a large SN ratio or that has relatively small disturbance induced by the plasma or spatter in laser machining.

In the seventh embodiment, the input signal generator generates two-line ac outputs of different phase, then inputting one of them into the sensing electrode 1 while inputting the other into the computing unit for computation. However, such configuration can be applied to other embodiments, too, such as the first to sixth embodiments. Particularly, if the unbalanced-output sin/cos oscillating circuit 22 shown in FIG. 13 or balanced-output sin/cos oscillating circuit is used as the oscillating circuit 22, the two outputs have a phase difference of 90 degrees. Therefore, such circuit is preferable to a capacitive detection. Consequently, if the input signal generator is combined with the rectifying circuit 18, multiplying circuit 19 or sampling circuit 20, it is possible to remove the high frequency disturbance caused by the plasma or spatter.

While, various modified examples of input signal generator or computing unit are described in the above embodiments, each example of the input signal generators and each example of the computing units may be used in a different combination.

The preferred embodiments described herein are illustrative and not restrictive, the scope of the invention being indicated in the appended claims and all variations which come within the meaning of the claims are intended to be embraced therein.

What is claimed is:

1. A distance detector for use in a laser beam machine, said laser beam machine detecting a distance between a focal position of a laser beam and a workpiece by use of a capacitance, then irradiating a condensed laser beam on said workpiece for laser beam machining, while controlling said distance between said focal position and said workpiece, said distance detector comprises:

a sensing electrode forming a capacitance relative to said workpiece;

an input signal generator generating a first alternating signal defining an input signal, said input signal being input into said sensing electrode;

a signal detector detecting a second alternating signal defining a detection signal, said detection signal being generated at said sensing electrode and having a value varied in accordance with said capacitance between said sensing electrode and said workpiece;

a computing unit receiving said input signal from said input signal generator and said detection signal from said signal detector, said computing unit extracting a component having a same frequency as a frequency of said input signal from said detection signal, thereby computing said extracted component to generate a distance information output representing said distance between said focal position and said workpiece.

2. A distance detector according to claim 1, in which said input signal generator has a constant alternating current source.

3. A distance detector according to claim 1, in which said input signal generator has a constant alternating voltage source.

4. A distance detector according to claim 1, in which said input signal generator outputs a sinusoidal wave of a specific frequency.

5. A distance detector according to claim 1, in which said computing unit detects a phase of said input signal and synchronously rectifies said detection signal on the basis of said phase of said input signal.

6. A distance detector according to claim 1, in which said computing unit has a multiplying circuit and a smoothing circuit, said multiplying circuit multiplying said input signal and said detection signal, said smoothing circuit smoothing an output of said multiplying circuit.

7. A distance detector according to claim 1, in which said computing unit samples said detection signal on the basis of a timing or a phase of said input signal, thereby computing said detection signal to generate said distance information output.

8. A distance detector according to claim 5, in which said computing unit further has a phase shifting circuit, said computing unit shifting and controlling a phase of said input signal by said phase shifting circuit so as to compute said detection signal on the basis of a phase-controlled input signal.

9. A distance detector according to claim 6, in which said computing unit further has a phase shifting circuit, said computing unit shifting and controlling a phase of said input signal by said phase shifting circuit so as to compute said detection signal on the basis of a phase-controlled input signal.

10. A distance detector according to claim 7, in which said computing unit further has a phase shifting circuit, said computing unit shifting and controlling a phase of said input signal by said phase shifting circuit so as to compute said detection signal on the basis of a phase-controlled input signal.

11. A distance detector according to claim 5, in which said computing unit further has a phase shifting circuit, said computing unit shifting and controlling a phase of said detection signal by said phase shifting circuit so as to compute a phase-shifted detection signal on the basis of said input signal.

12. A distance detector according to claim 6, in which said computing unit further has a phase shifting circuit, said computing unit shifting and controlling a phase of said detection signal by said phase shifting circuit so as to compute a phase-shifted detection signal on the basis of said input signal.

13. A distance detector according to claim 7, in which said computing unit further has a phase shifting circuit, said computing unit shifting and controlling a phase of said detection signal by said phase shifting circuit so as to compute a phase-shifted detection signal on the basis of said input signal.

14. A distance detector according to claim 5, in which said input signal generator generates dual alternating signals of different phase as said input signal, one of said dual alternating signals being input into said sensing electrode, the other of said dual alternating signals being input into said computing unit.

15. A distance detector according to claim 6, in which said input signal generator generates dual alternating signals of different phase as said input signal, one of said dual alternating signals being input into said sensing electrode, the other of said dual alternating signals being input into said computing unit.

16. A distance detector according to claim 7, in which said input signal generator generates dual alternating signals of different phase as said input signal, one of said dual alternating signals being input into said sensing electrode, the other of said dual alternating signals being input into said computing unit.

* * * * *